UNITED STATES PATENT OFFICE.

ROBERT ABBOTT HADFIELD, OF SHEFFIELD, ENGLAND.

PROCESS FOR IMPROVING THE MAGNETIC QUALITIES OF A MAGNETIC BODY.

1,082,947.  Specification of Letters Patent.  Patented Dec. 30, 1913.

No Drawing. Application filed March 21, 1907, Serial No. 363,654. Renewed June 2, 1913. Serial No. 771,339.

*To all whom it may concern:*

Be it known that I, ROBERT ABBOTT HADFIELD, a subject of the King of Great Britain, of Sheffield, England, have invented a certain new and useful Improvement in Processes for Improving the Magnetic Qualities of a Magnetic Body, of which the following is a specification.

The invention is a process for improving certain magnetic qualities of a magnetic body, and more especially of alloys of iron and silicon, or iron-silicon and aluminium or iron-silicon and manganese, in order to increase the magnetic permeability and electric resistance and lower the hysteresis action of the said body; and thus to adapt it for use in ballast-coils, transformer-plates and like electrical apparatus, where the reduction of magnetic and electric losses to the lowest possible degree is of great importance.

In carrying my process into effect, as a first step, I heat the body to a temperature considerably below its melting point—say about between 700° and 800° centigrade, and then allow it to cool slowly. I then, as a second step, reheat the body to a temperature higher than that employed during the first heating, but still below the melting point—say between 900° and 1000° centigrade. Then the body is allowed or caused to cool rapidly. Either one or both of the steps of this process may be repeated.

In U. S. Letters Patent No. 767,110 granted to me Aug. 9, 1904, I have described the improvement of the magnetic qualities of magnetic bodies by means of a process or method of which one essential step was the reduction of the body to the condition of a thin sheet or plate. In my present process this step is omitted, and with it, of course, the special previous heat treatment which enables the mechanical operation of rolling or forging to be performed.

Cooling rapidly as herein referred to means cooling at such a rate as that the changes effected by raising the material to the definite temperature stated are retained substantially unaltered. Cooling slowly as herein referred to means cooling at such a rate as to permit the slow rearrangement of the molecules with reference to one another so that the condition of strain or hardness is removed and the material becomes soft, often accompanied by a more uniform distribution of the elements throughout the mass.

I claim:

1. The process of reducing the total magnetic and electric loss in a magnetic body composed of iron alloyed with other elements, which consists in first heating said body to a temperature below its melting point, cooling slowly, then heating said body to a higher temperature than the first heating but also below its melting point, and then allowing or causing said body to cool rapidly.

2. The process of reducing the total magnetic and electric loss in an alloy containing iron and silicon, which consists in first heating said alloy to a temperature ranging from about 700° C. to about 800° C. then cooling slowly, then reheating said alloy to a temperature ranging from about 900° C. to about 1000° C. and then allowing or causing said alloy to cool rapidly.

3. The process of reducing the total magnetic and electric loss in a magnetic body composed of iron alloyed with other elements, which consists in first heating said body to a temperature below its melting point, then cooling said body slowly, then reheating said body to a temperature of about 100° C. higher than the first but also below its melting point and finally cooling said body rapidly.

4. The process of reducing the total magnetic and electric loss in a magnetic body composed of iron alloyed with other elements which consists in first heating said body at least once to a high temperature but not above about 800° C. and then cooling slowly and thereafter in heating said body at least once to a temperature considerably above 800° C. but not above about 1000° C. and then cooling rapidly.

5. The process of reducing the total magnetic and electric loss in a magnetic body composed of iron alloyed with other elements, which consists in two heatings and coolings, the first consisting in heating said body to a high temperature, but not substantially above 800° C., and then cooling slowly, and next heating said body to a temperature considerably above 800° C. but not substantially above about 1000° C. and then cooling rapidly.

6. The herein described process of reducing the total magnetic and electric loss in a magnetic body which consists in alloying iron with silicon and with another material such as aluminium and manganese, then heating said alloy to a temperature of from about 700° C. to 800° C., then cooling slowly, then reheating said alloy to a temperature of from about 900° C. to about 1000° C. and then permitting said alloy to cool rapidly.

In testimony whereof, I have signed my name hereto in the presence of two witnesses.

ROBERT ABBOTT HADFIELD.

Witnesses:
 WILLIAM CROSS,
 JOHN WM. CRAWLEY.